(12) United States Patent
Nakai et al.

(10) Patent No.: US 7,291,375 B2
(45) Date of Patent: **\*Nov. 6, 2007**

(54) PHASE-CHANGE OPTICAL RECORDING MEDIUM

(75) Inventors: Tsukasa Nakai, Hino (JP); Sumio Ashida, Yokohama (JP); Keiichiro Yusu, Yokohama (JP); Takayuki Tsukamoto, Kawasaki (JP); Noritake Oomachi, Yokohama (JP); Naomasa Nakamura, Yokohama (JP); Katsutaro Ichihara, deceased, late of Yokohama (JP); by Urara Ichihara, legal representative, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/453,855

(22) Filed: Jun. 16, 2006

(65) Prior Publication Data

US 2006/0269719 A1    Nov. 30, 2006

Related U.S. Application Data

(62) Division of application No. 10/878,657, filed on Jun. 29, 2004, now Pat. No. 7,132,147.

(30) Foreign Application Priority Data

Jul. 1, 2003 (JP) ............................. 2003-189670

(51) Int. Cl.
    *B32B 3/02* (2006.01)
(52) U.S. Cl. .................. 428/64.4; 428/64.5; 428/64.6; 430/270.13

(58) Field of Classification Search ............... 428/64.4, 428/64.5, 64.6; 430/270.13
See application file for complete search history.

(56) References Cited

U.S. PATENT DOCUMENTS

| 6,042,921 | A  | 3/2000  | Yoshinari et al. |
| 6,153,063 | A  | 11/2000 | Yamada et al.    |
| 6,312,780 | B1 | 11/2001 | Kasami et al.    |

(Continued)

FOREIGN PATENT DOCUMENTS

JP          09-282713          10/1997

(Continued)

OTHER PUBLICATIONS

Sumio Ashida et al., "Fast deposition of the dielectric film for the rewritable HD DVD," Proceedings of the 15th Symposium on Phase Change Optical Information Storage, PCOS 2003, Oct. 30-31, 2003, pp. 62-66.

*Primary Examiner*—Elizabeth Mulvaney
(74) *Attorney, Agent, or Firm*—Pillsbury Winthrop Shaw Pittman, LLP

(57) ABSTRACT

A phase-change optical recording medium has a phase-change recording film to which recording and erasure can be reversibly performed by irradiation with light, and at least one dielectric film formed of a SiOC film containing Si, O and C, and having a carbon concentration within a range of between 0.1 and 30 atomic %.

12 Claims, 4 Drawing Sheets

| U.S. PATENT DOCUMENTS | | | | FOREIGN PATENT DOCUMENTS | | |
|---|---|---|---|---|---|---|
| 6,551,679 B1 | 4/2003 | Kuroda et al. | JP | 11-3538 | 1/1999 |
| 6,709,801 B2 | 3/2004 | Miyamoto et al. | JP | 2000-090491 | 3/2000 |
| 2003/0161257 A1 | 8/2003 | Yusu et al. | JP | 2000-215516 | 8/2000 |
| 2004/0076908 A1 | 4/2004 | Oomachi et al. | JP | 2002-269823 | 9/2002 |
| 2005/0106353 A1 | 5/2005 | Nakai et al. | WO | WO 03/025922 A1 | 3/2003 |

PHASE-CHANGE OPTICAL RECORDING MEDIUM

CROSS-REFERENCE TO RELATED APPLICATIONS

This application is a divisional of U.S. application Ser. No. 10/878,657, filed Jun. 29, 2004, now U.S. Pat. No. 7,132,147 and for which priority is claimed under 35 U.S.C. §121. This application is based upon and claims the benefit of priority under 35 U.S.C. § 119 from the prior Japanese Patent Application No. 2003-189670, filed Jul. 1, 2003, the entire contents of both applications are incorporated herein by reference in their entireties.

BACKGROUND OF THE INVENTION

1. Field of the Invention

The present invention relates to a phase-change optical recording medium for recording information by reversibly changing the state of a recording film by irradiation with a light beam, more particularly, to a phase-change optical recording medium in which atomic arrangement of the recording film is changed between an amorphous state and a crystalline state.

2. Description of the Related Art

The principle of recording, erasure and reproduction in a phase-change optical recording medium is as follows. When a portion of a phase-change recording film is heated by irradiation with light to a temperature higher than the melting point thereof, the heated portion is melted. Then, the melted portion is rapidly cooled, the portion becomes to have amorphous atomic arrangement, with the result that information is recorded in that portion. Now, if the phase-change recording film is retained for a prescribed time or more within a temperature range lower than the melting point and higher than the crystallizing temperature, the phase-change recording film is crystallized in the case where the film assumes an amorphous state in the initial stage, though the crystalline state is maintained in the case where the film assumes a crystalline state in the initial stage. Thus, erasure is performed under the particular conditions. In such a phase-change recording film, the reflected light intensity from the amorphous portion differs from that from the crystalline portion. It follows that it is possible to read the recorded information by converting the reflected light intensity into electric signals, followed by analog to digital conversion.

In order to increase the recording density of the phase-change optical recording medium, it is conceivable to employ two approaches given below. One approach is to reduce a recording mark pitch in the track direction. In this case, however, since the recording mark is rendered smaller than the reproduction beam size when the pitch reduction is advanced, two recording marks may be temporarily included in the reproducing beam spot. Therefore, signal amplitude is lowered in the case where the recording marks are positioned very close to each other, though significantly high signal amplitude can be obtained in the case where the recording marks are positioned sufficiently away from each other. When signals with low amplitude are converted into digital data, errors are likely to be generated.

Another approach for increasing the recording density is to reduce a track pitch. This approach makes it possible to increase the recording density without significantly lowering the signal intensity, unlike the case of reducing the recording mark pitch noted above. Where the track pitch is reduced to a level substantially equal to or smaller than the beam size, however, this approach would bring about a problem of the so-called "cross-erase", that is, the information recorded in a certain track would be deteriorated in a process of writing or erasure in the adjacent tracks.

Therefore, it is necessary to overcome the above-noted problems in order to increase the recording density of the phase-change optical recording medium.

In the optical disk drive system for the next generation DVD, it is a target to overcome the problems noted above by irradiating the phase-change optical recording medium with a laser beam having a beam size condensed to a level close to the diffraction limit. Various proposals have been made along this line. However, it cannot be expected to optically reduce the beam size further, as far as visible light is used. It has also been studied to use near-field light in an attempt to reduce the beam size further. However, various problems are left unsolved in the optical recording medium using the near-field light and, thus, such a medium has not yet entered the stage of the practical application. Such being the situation, in order to improve the recording density, it is considered as the best approach to decrease the cross-erase in place of reducing the beam size.

The cross-erase noted above would be brought about by two causes. One of the causes is that, when an adjacent track to a track in question is irradiated with a laser beam, the foot portion of the laser beam overlapping the track in question has a considerably high intensity, with the result that the recording mark in that track is deteriorated by only the effect of the light application. Another cause is that, when an adjacent track to a track in question is heated by a laser beam, the generated heat is conducted to the track in question by heat transfer in the in-plane direction, with the result that the shape of the recording mark in that track is deteriorated under the thermal effect.

The cross-erase generated by the latter cause can be decreased by lowering the heat transfer in the in-plane direction. Therefore, a so-called "rapid cooling structure" is employed to decrease the cross-erase, in which structure a film having high thermal conductivity and/or high heat capacity is arranged in the vicinity of the recording film so as to promote the heat transfer in the perpendicular direction to the plane rather than that in the in-plane direction.

For example, in the conventional phase-change optical recording medium, a dielectric film (heat control film) having appropriate thermal conductivity is arranged between the recording film and a metal reflection film, and the dielectric film is formed relatively thin. The particular structure facilitates diffusion of the heat generated in the recording film to the reflection film so as to produce the effect of suppressing the heat transfer in the in-plane direction.

In the structure pointed out above, if the heat control film is made thinner, the heat transfer in the perpendicular direction to the plane can be promoted, which produces the effect of improving the cross-erase. However, if the heat control film is excessively thin, the heat transfer to the reflection film is caused simultaneously with heating the recording film by a laser beam in the recording process. As a result, temperature elevation of the recording film is rendered insufficient and, thus, a region that is heated to reach the melting point is made small so as to give rise to a problem that it is impossible to form a recording mark having a desired area. It should also be noted that, in the erasure process, the recording film is cooled simultaneously with the heating, with the result that the time period during which the recording film is retained within a temperature range in which the recording film can be crystallized is rendered insufficient. Thus, it is difficult to crystallize the recording mark so as to give rise to a problem that an erasure rate (erase rate or erasability) is markedly lowered.

To the contrary, where the heat control film is excessively thick, the problems can be eliminated in respect of the power margin of the laser beam in the recording process and the erasure rate. However, the in-plane heat transfer is promoted so as to cause the cross-erase problem easily. In addition, the cooling rate of the recording film is lowered, which causes the region that has been melted in the recording process to be recrystallized without being made amorphous, with the result that the mark formed is rendered excessively small.

Conventionally, a phase-change optical recording medium for suppressing the cross-erase is proposed (see Unexamined Japanese Patent Publication No. 2000-215516). The phase-change optical recording medium comprises a recording film, an upper protective film, an intermediate film, and a reflection film, which are formed in this order as viewed from the light incident side, in which characteristics of the material used for the intermediate film or the reflection film are defined to suppress the cross-erase. In this prior art, however, since the intermediate film uses a material having low thermal conductivity, it is difficult to rapidly cool the recording film, resulting in failure to produce a sufficient effect of suppressing the cross-erase.

As described above, it is known to the art to control the thickness and the thermal conductivity of the dielectric film arranged between the recording film and the metal reflection film. However, the conventional techniques were incapable of solving simultaneously all the problems including the sensitivity of the recording power, the cross-erase, the recrystallization and the erasure rate.

Also, a technique for lowering thermal damage to the recording film and the substrate is known, which uses SiC excellent in thermal conductivity for the second dielectric film in a phase-change optical recording medium comprising a first dielectric film, a recording film, a second dielectric film, and a reflection film, which are stacked in this order as viewed from the light incident side (see Unexamined Japanese Patent Publication No. 11-003538). However, the cross-erase is not studied in this prior art. It should be noted that it is impossible to achieve good recording characteristics and to suppress the cross-erase simultaneously by simply cooling the recording film.

Likewise, a technique for lowering thermal damage to the recording film is known, which uses SiC for at least a part of the first and second dielectric films in a phase-change optical recording medium comprising a first dielectric film, a recording film, a second dielectric film, and a reflection film, which are stacked in this order as viewed from the light incident side (see Unexamined Japanese Patent Publication No. 2002-269823). However, the cross-erase is not studied also in this prior art. Since the main purpose of this prior art is to improve overwrite characteristics by simply cooling the recording film and suppressing the thermal damage, it is impossible to suppress the cross-erase problem in this prior art.

BRIEF SUMMARY OF THE INVENTION

An object of the present invention is to provide a phase-change optical recording medium having a high recording density, which can suppress the cross-erase even when the track pitch is reduced.

A phase-change optical recording medium according to one aspect of the present invention comprises: a phase-change recording film to which recording and erasure can be reversibly performed by irradiation with light; and at least one dielectric film formed of a SiOC film containing Si, O and C, and having a carbon concentration within a range of between 0.1 and 30 atomic %.

DETAILED DESCRIPTION OF THE INVENTION

Figure 1:
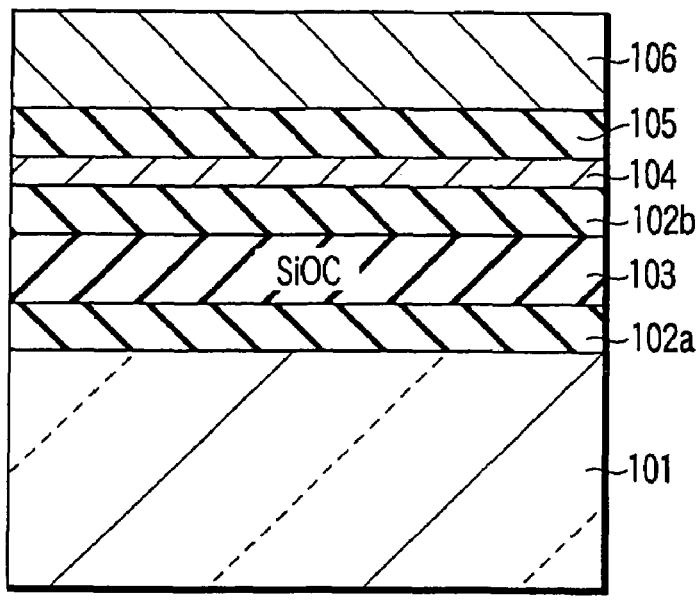
FIG. 1 is a cross-sectional view of the phase-change optical recording medium (single-layer disc) for Example 1 of the present invention.

Embodiments of the present invention will now be described.

The phase-change optical recording medium according to embodiments of the present invention may be a single-layer disc or a dual-layer, single-sided disc prepared by bonding an $L_0$ disc on the light incident side to an $L_1$ disc on the inside. The dual-layer, single-sided disc means that the two recording layers are accessed from one side. In either case, the recording medium has basically a stacked structure of a first dielectric film, a phase-change recording film, a second dielectric film and a metal reflection film, stacked in this order from the light incident side, in which at least one of the first dielectric film and the second dielectric film includes a SiOC film.

A material used for the phase-change recording film includes GeSbTeBi, GeSbTe, BiGeTe, GeSbTeSn, AgInSbTe, InSbTe, AgInGeSbTe, GeInSbTe and AgInSbTeV. Incidentally, it is possible to arrange an interface film formed of, for example, GeN, CrO, SiC or SiN on both surfaces or on one surface of the phase-change recording film.

As described above, the decrease of the cross-erase is considered to be the best approach for increasing the recording density of the phase-change optical recording medium. The most effective approach for decreasing the cross-erase has been expected to transfer the heat generated by irradiation with a laser beam in the perpendicular direction to the plane, and various proposals has been presented so far on the basis of the similar idea. However, although the thin films used in the phase-change optical recording medium have a thickness in the nanometer order, the thermal characteristics such as the thermal conductivity of the films have conventionally been estimated in many cases at the values substantially equal to those of the bulk materials. However, where thin films each having a thickness in the nanometer order are stacked, interfacial thermal resistance or contact thermal resistance $R_{th}$ between the adjacent films, also referred to as boundary thermal resistance, can be substantially equal to or even higher than the thermal resistance of the film accompanying the heat transfer. It was scarcely recognized in the past that the particular effect was involved in the process of the cross-erase. Thus, there was no fully understanding for the phenomenon relating to highly dynamic structural change due to transitions between the crystalline state and the amorphous state occurring in the recording film and the phenomenon of the heat transfer in the process of recording and erasure to the actual phase-change optical recording medium. Therefore, it is necessary to understand the thermal behaviors of the recording film in the process of recording and erasure.

The present inventors have found that, where a SiOC film containing silicon (Si), oxygen (O) and carbon (C), the carbon concentration falling within a range of between 0.1 atomic % and 30 atomic %, is used for at least one dielectric film included in a phase-change optical recording medium, it is possible to cause the heat generated by irradiation with a laser beam to be effectively transferred in the perpendicular direction to the plane so as to decrease the cross-erase. In the embodiments of the present invention, the SiOC film means a film containing Si, O and C as main components, i.e., the sum of the concentrations of Si, O and C in the SiOC film is typically at least 99 atomic %. The SiOC film may contain a very small amount of inevitable impurities.

It has been found that the SiOC film having the above composition represents thermal conductivity $\lambda$th [W/m·K] within a range of $0.6 < \lambda_{th} < 4.0$ at room temperature and under an atmospheric pressure and contributes to desired heat transfer.

For example, where a stacked dielectric film including a high refractive index dielectric film, a low refractive index dielectric film and a high refractive index dielectric film is formed on the light incident side relative to the phase-change recording film as the first dielectric film and a SiOC film is used for the low refractive index dielectric film, the heat is transferred satisfactorily from the phase-change recording film to the SiOC film, i.e., from the phase-change recording film in the direction opposite to the direction toward the reflection film. As a result, intense reproduction signals can be obtained without bringing about the cross-erase and recording marks having a good shape can be formed, making it possible to achieve a high recording density. Incidentally, the high refractive index dielectric film is formed of, for example, ZnS—SiO$_2$.

Also, if a SiOC film is used as the second dielectric film formed on the side opposite to the light incident side relative to the phase-change recording film, the heat is transferred satisfactorily from the phase-change recording film to the SiOC film, i.e., from the phase-change recording film toward the reflection film. As a result, intense reproduction signals can be obtained without bringing about the cross-erase and recording marks having a good shape can be formed, making it possible to achieve a high recording density.

The structure described above can be applied to the single-layer disc and to any of the $L_0$ disc on the light incident side and the $L_1$ disc on the inside of the dual-layer, single-sided disc. It is also possible to use the SiOC film for both of the dielectric films on the light incident side and on the inside relative to the phase-change recording film.

A satisfactory resistance to the cross-erase, which was not obtained in the conventional phase-change optical recording medium, can be obtained in the present invention using the SiOC film for at least one of the dielectric films. The reasons for the prominent effect produced by the use of the SiOC film are described below.

First, the SiOC film has a very high adhesion to another film such as a ZnS—SiO$_2$ film, so that the surface of the SiOC film is rendered smooth. Thus, it is possible to lower markedly the thermal resistance (contact thermal resistance $R_{th}$) at the interface between the adjacent films so as to make it possible to achieve a satisfactory heat transfer from the phase-change recording film to the SiOC film. In addition, the SiOC film has an improved thermal conductivity compared to SiO$_x$ (x=1 to 2). Also, since another film formed on the SiOC film is maintained smooth, the contact thermal resistance of the entire phase-change optical recording medium can be decreased. As described above, since highly dynamic structural change due to transitions between a crystalline state and an amorphous state is brought about in the recording film in the process of recording and erasure to the phase-change optical recording medium, the adhesion between the adjacent films constitutes a very important factor. The particular effect can be obtained in the case where the carbon concentration in the SiOC film is 0.1 atomic % or more, with more effective carbon concentration being 1 atomic % or more.

Next, it is known to the art that the SiC film has low transmittance of about 20% for a thickness of 100 nm in blue-violet band, i.e., the wavelength $\lambda$ in the vicinity of 400 nm. The SiOC film may be expected to have transmittance between those of SiO$_x$ (x=1 to 2) and SiC, which may be significantly lower than that of SiO$_x$. However, the present inventors have found that, in the SiOC film having the carbon concentration within a range of between 0.1 atomic % and 30 atomic %, the decrease of the transmittance is far smaller than expected. It is conceivable that, in the SiOC film, the bonding form of the Si—O bond would be changed due to the presence of carbon (C) and, thus, carbon does not cause optical scattering or absorption. To be more specific, it has been found in respect of the infrared (IR) absorption spectrum that, when the absorption peak attributed to the Si—O bond in the SiOC is shifted by 0.1 to 50 cm$^{-1}$ toward the smaller wavenumber compared to the absorption peak attributed to the Si—O bond in SiO$_2$, the transmittance is maintained at 95% or more even if the carbon concentration is relatively high. Incidentally, it is possible to use any absorption peak attributed to Si—O in an IR spectrum for measuring the peak shift. However, it is desirable to observe the peak in the vicinity of 1050 cm$^{-1}$ having relatively high peak intensity.

Further, the present inventors have also found that, when the SiOC film is analyzed by X-ray photoelectron spectroscopy (XPS), an O—Si—C bond can be observed as described later.

The present inventors have also found that the SiOC film having the carbon concentration within a range of between 0.1 atomic % and 30 atomic % exhibits good optical characteristics such that the complex refractive index denoted by n-ik satisfies the conditions of $1.45 < n < 1.55$ and $k < 0.01$. These values are markedly lower than the values anticipated under an assumption that a SiOC film is a mixed film consisting of SiO$_x$ (x=1 to 2) and SiC and the refractive index n and the extinction coefficient k may be calculated as arithmetic mean using the refractive index n of about 1.47 for SiO$_x$ and about 2.8 to 3.4 for SiC, and the relatively high extinction coefficient k for SiC. The upper limit of the carbon concentration in the SiOC film exhibiting the particular optical characteristics noted above is 30 atomic %.

In order to obtain a suitable SiOC film, it is desirable to set appropriately deposition conditions by sputtering. It is possible to use a sputtering target containing as the main component Si, C, SiC or $SiO_x$ (x=1 to 2), or a mixture thereof. The sputtering target may contain a trace of binder that is not taken into the film as a main component. A mixed gas containing a rare gas such as Ar and oxygen ($O_2$) can be used as a discharge gas. Carbon dioxide ($CO_2$) and methane can also be used as the discharge gas. Sputtering methods include RF sputtering, RF-superimposed DC sputtering, pulse mode DC sputtering, and DC sputtering, which are selected in accordance with the resistance of the sputtering target used. Here, the RF-superimposed DC sputtering means that the sputtering system uses both RF and DC discharge.

To be more specific, where RF sputtering is carried out using a SiC target or a mixed target formed of Si and SiC under a gas containing Ar and $O_2$, it is desirable to set the total pressure of the sputtering gas at 1 Pa or less and the oxygen partial pressure at 0.01 to 0.5 Pa, preferably at 0.01 to 0.1 Pa.

It has been found that, if the sputtering conditions are set appropriately, the deposition rate of the SiOC film can be improved compared with that of SiOx.

Incidentally, the SiOC film may be a so-called "functionally graded material" having concentration gradient of carbon (C) in the film. The concentration gradient of carbon in the SiOC film can be changed according to sputtering conditions. Qualitatively speaking, as the concentration of carbon (C) in the SiOC film is higher, the thermal conductivity, the refractive index and the absorption become higher. For example, if the SiOC film is formed such that the carbon concentration is high in the region close to the recording film and low in the region remote from the recording film, it is considered possible to allow the SiOC film to perform the function that makes the heat generated in the recording film diffuse promptly and store in a region somewhat away from the recording film so as to control the rapid cooling rate and the slow cooling rate. On the other, there is a case where it is desirable to design the film structure such that the heat radiation is performed uniformly. In this case, it is desirable to carry out sputtering under the conditions that the carbon concentration is maintained constant. Also, if sputtering is carried out in separated stages, it is possible to increase or decrease the carbon concentration so as to markedly broaden the degree of freedom of the design. Further, it is possible to allow the SiOC film to perform the function of a stress relaxation film by adjusting the carbon concentration distribution in the SiOC film.

EXAMPLES

Examples of the present invention will now be described in detail.

A SiOC film alone was deposited on a substrate under the conditions equal to those for each of the Examples and Comparative Examples described herein later, and the various properties of the SiOC film were analyzed as follows. A composition of the SiOC film was analyzed by analytical methods such as ICP (Induced Coupled Plasma), RBS (Rutherford Backscattering Spectrometry), and SIMS (Secondary Ion Mass Spectroscopy). Thermal properties such as thermal conductivity and interfacial thermal resistance of the SiOC film were measured by a thermoreflectance method or a 3ω method. Optical properties such as a complex refractive index n, an extinction coefficient k, and transmittance T of the SiOC film were measured with a spectrophotometer and a spectroscopic ellipsometer. A Si—O bonding form in the SiOC film, i.e., a peak shift was examined by IR (Infrared Spectroscopy), and a bonding state between Si, O and C in the SiOC film was examined by XPS (X-ray Photoelectron Spectroscopy), respectively. Surface smoothness of a thin film was observed with an atomic force microscope (AFM).

Example 1

Single-Layer Disc, without an Interface Film

FIG. 1 is the cross-sectional view of the phase-change optical recording medium for Example 1.

The substrate 101 is formed of a polycarbonate disc having a thickness of 0.6 mm. Grooves each having a depth of 40 nm are formed on the surface of the substrate 101 at a pitch of 0.68 μm. In the case of carrying out land/groove recording, the track pitch is set at 0.34 μm. In the following description, the term "groove track" denotes the track closer to the light incident surface, and the term "land track" denotes the track remoter from the light incident surface.

The films given below were successively formed on the substrate 101 from the light incident side.

High refractive index dielectric film 102a: ZnS—$SiO_2$, 30 nm;
Low refractive index dielectric film 103: SiOC, 60 nm;
High refractive index dielectric film 102b: ZnS—$SiO_2$, 25 nm;
Phase-change recording film 104: GeSbTeBi, 13 nm;
Second dielectric film 105: ZnS—$SiO_2$, 20 nm; and
Reflection film 106: Ag alloy, 100 nm.

In the phase-change optical recording medium for Example 1, the first dielectric film formed on the light incident side relative to the phase-change recording film 104 is of a stacked structure of the high reflective index dielectric film 102a, the low refractive index dielectric film 103 and the high refractive index dielectric film 102b. Incidentally, the material ZnS—$SiO_2$ used for the high refractive index dielectric film is a mixture of ZnS and $SiO_2$.

In this Example, the SiOC film used as the low refractive index dielectric film 103 was deposited by pulse mode DC sputtering using Si and SiC target under the conditions that a total pressure of sputtering gas consisting of Ar and $O_2$ was set at 1.0 Pa, and an oxygen partial pressure was set at 0.1 Pa. The carbon concentration in the SiOC film was 28.2 atomic %.

Further, the substrate was coated with ultraviolet curable resin by spin coating, and the other polycarbonate substrate having a thickness of 0.6 mm was adhered to the substrate 1, followed by UV curing.

Table 1 shows the discharge method employed in the deposition process of the SiOC film, the total pressure [Pa], the oxygen partial pressure [Pa], and the carbon (C) concentration [atomic %], the silicon (Si) concentration [atomic %] and the oxygen (O) concentration [atomic %] in the SiOC film.

Table 2 shows the optical characteristics (the refractive index n, the extinction coefficient k, and the transmittance T) of the SiOC film at the wavelength of 405 nm, the thermal conductivity of the SiOC film measured at room temperature and under atmospheric pressure, and the shift amount of the IR peak.

The phase-change optical recording medium thus manufactured was set in an initializing apparatus and was irradiated with an oblong beam having a width of 50 nm and a length of 1 μm so as to initialize (crystallize) the recording film entirely.

Prior to the evaluation of the disc characteristics of the phase-change optical recording medium, the reflectance of the recording medium was measured. It was found that the disc represented a large reflectance difference more than 15% between the crystalline portion and the amorphous portion.

Recording and erasure experiments were carried out to the phase-change optical recording medium. In these experiments, an optical disc evaluating apparatus was used, the apparatus including a pick-up equipped with an objective lens having NA of 0.65 and a semiconductor laser having a wavelength of 405 nm. 1-7 modulated signals were recorded at a recording linear velocity of 5.6 m/sec. The recording experiments were conducted using signals of 9T (T being the index denoting the signal length) with a bit pitch set at 0.13 μm and a maximum mark length set at 0.78 μm.

The experimental methods were as follows. For evaluating the characteristics of the land track or the groove track, the experiments were conducted while paying attentions such that the evaluation was not influenced by signals written in other tracks.

An initial CNR (Carrier to Noise Ratio) and cross-erase characteristics were measured by the experiments described in the following. In the first step, the optimum power was determined by measuring the dependence of CNR on a write power and an erase power. Then, random signals were overwritten with the optimum power 10 times on a land track or a groove track, followed by writing signals of 9T. At this stage, CNR of the 9T signals on that track was measured. Next, random signals were written on the adjacent tracks on both sides of the track in question. Further, CNR of the 9T signals was measured on the track in question where the 9T signals recorded previously. The difference between the former CNR value and the latter CNR value was defined as the cross-erase amount (X–E).

Also, in order to evaluate reliability of the phase-change optical recording medium, the manufactured phase-change optical recording medium was exposed to an environment of a temperature of 85° C. and a relative humidity of 85% for 300 hours. Then, the experiments same as above were conducted so as to measure a CNR value and cross-erase characteristics after the environmental test.

For evaluating overwrite characteristics, random signals were overwritten 2,000 times on the same track, followed by writing 9T signals so as to measure a CNR value.

As shown in Table 3, the phase-change optical recording medium for the Example 1 exhibited satisfactory initial characteristics, i.e., the CNR of 55.2 dB, and the X–E of 0.2 dB, satisfactory characteristics after the environmental test, i.e., the CNR of 53.8 dB, and the X–E of 0.3 dB, and satisfactory overwrite characteristics, i.e., the CNR of 54.7 dB.

Examples 2 to 10 and Comparative Examples 1 to 8

Various phase-change optical recording media were manufactured. Table 1 shows conditions for depositing a SiOC film, and Table 2 shows properties of the SiOC film. Further, Table 3 shows the initial CNR and cross-erase characteristics, the CNR and cross-erase characteristics after the environmental test, and the overwrite characteristics.

Example 2

Single-Layer Disc, Including Interface Films

Figure 2:
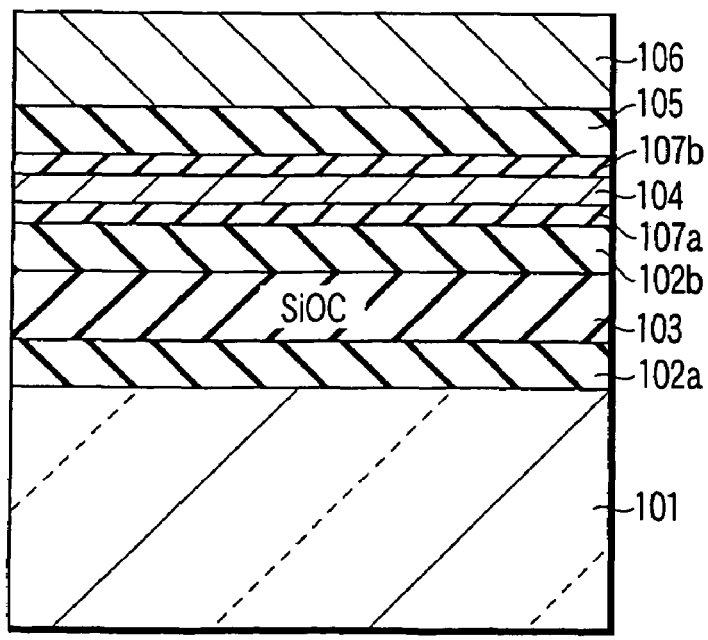
FIG. 2 is a cross-sectional view of the phase-change optical recording medium (single-layer disc) for Example 2 of the present invention.

FIG. 2 is the cross-sectional view of the phase-change optical recording medium for Example 2. The films given below were successively formed on the polycarbonate substrate 101 having a thickness of 0.6 mm from the light incident side.

High refractive index dielectric film 102a: ZnS—SiO$_2$, 30 nm;
Low refractive index dielectric film 103: SiOC, 60 nm;
High refractive index dielectric film 102b: ZnS—SiO$_2$, 25 nm;
Lower interface film 107a: GeN, 5 nm;
Phase-change recording film 104: GeSbTe, 13 nm;
Upper interface film 107b: GeN, 5 nm;
Second dielectric film 105: ZnS—SiO$_2$, 15 nm; and
Reflection film 106: Ag alloy, 100 nm.

In this Example, the GeN interface films 107a and 107b were formed on the upper and lower surfaces of the phase-change recording film 104.

In this Example, the SiOC film used as the low refractive index dielectric film 103 was deposited by RF sputtering under the conditions of a total pressure of 1.0 Pa and an oxygen partial pressure of 0.02 Pa. The carbon concentration in the SiOC film was 30.0 atomic %. The thermal conductivity $\lambda_{th}$ of the SiOC film was 2.00 [W/m·K]. The phase-change optical recording medium was manufactured as in Example 1 in respect of the other conditions.

Incidentally, when a SiOC film having a carbon concentration of 30.0 atomic % was deposited using other deposition method than the above method, it was confirmed that a thermal conductivity $\lambda_{th}$ of about 4 [W/m·K] was realized.

As apparent from Table 3, the phase-change optical recording medium for the Example 2 was also found to be satisfactory in any of the initial characteristics, the characteristics after the environmental test, and the overwrite characteristics.

Example 3

Single-Layer Disc, Including an Interface Film

The films given below were successively formed on the polycarbonate substrate having a thickness of 0.6 mm from the light incident side.

High refractive index dielectric film: ZnS—SiO$_2$, 30 nm;
Low refractive index dielectric film: SiOC, 60 nm;
High refractive index dielectric film: ZnS—SiO$_2$, 25 nm;
Phase-change recording film: GeSbTe, 13 nm;
Interface film: GeN, 5 nm;
Second dielectric film: ZnS—SiO$_2$, 15 nm; and
Reflection film: Ag alloy, 100 nm.

In this Example, the GeN interface film was formed on the upper surface alone of the phase-change recording film.

In this Example, the SiOC film used as the low refractive index dielectric film was deposited by RF sputtering under the conditions of a total pressure of 1.0 Pa and an oxygen partial pressure of 0.2 Pa. The carbon concentration in the SiOC film was 19.7 atomic %. The phase-change optical recording medium was manufactured as in Example 1 in respect of the other conditions.

As apparent from Table 3, the phase-change optical recording medium for the Example 3 was also found to be satisfactory in any of the initial characteristics, the characteristics after the environmental test, and the overwrite characteristics.

Example 4

Single-Layer Disc, Including an Interface Film

The films given below were successively formed on the polycarbonate substrate having a thickness of 0.6 mm from the light incident side.
High refractive index dielectric film: ZnS—SiO$_2$, 30 nm;
Low refractive index dielectric film: SiOC, 60 nm;
High refractive index dielectric film: ZnS—SiO$_2$, 25 nm;
Phase-change recording film: GeSbTeBi, 13 nm;
Interface film: GeN, 2 nm;
Second dielectric film: ZnS—SiO$_2$, 18 nm; and
Reflection film: Ag alloy, 100 nm.

The GeN interface film was formed on the upper surface alone of the phase-change recording film in this Example, too.

In this Example, the SiOC film used as the low refractive index dielectric film was deposited by DC sputtering under the conditions of a total pressure of 1.0 Pa and an oxygen partial pressure of 0.08 Pa. The carbon concentration in the SiOC film was 10.3 atomic %. The phase-change optical recording medium was manufactured as in Example 1 in respect of the other conditions.

As apparent from Table 3, the phase-change optical recording medium for the Example 4 was also found to be satisfactory in any of the initial characteristics, the characteristics after the environmental test, and the overwrite characteristics.

Example 5

Dual-Layer Disc

Figure 3:
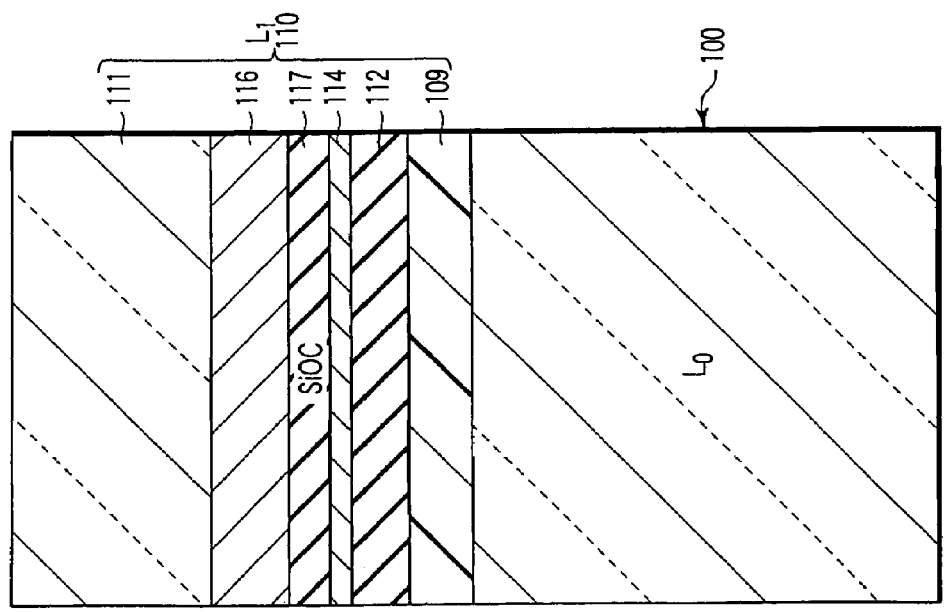
FIG. 3 is a cross-sectional view schematically showing the phase-change optical recording medium (dual-layer, single-sided disc) for Example 5 of the present invention.

FIG. 3 is the cross-sectional view schematically showing the phase-change optical recording medium for Example 5. The phase-change optical recording medium for this Example was a so-called dual-layer, single-sided disc, which was prepared by bonding the L$_0$ disc 100 positioned on the front side as viewed from the light incident side to the L$_1$ disc 110 positioned on the inside as viewed from the light incident side.

The L$_0$ disc 100 included a polycarbonate substrate having a thickness of 0.59 mm, and a ZnS—SiO$_2$ film, a GeSbTeBi film, a ZnS—SiO$_2$ film, an Ag film, and a ZnS—SiO$_2$ film, which were stacked in this order on the polycarbonate substrate. The transmittance of the L$_0$ disc 100 was about 50%.

The L$_1$ disc 110 included the polycarbonate substrate 111 having a thickness of 0.59 mm, and the reflection film 116, the second dielectric film 117, the phase-change recording film 114, and the first dielectric film 112, which were stacked in this order the polycarbonate substrate 111. The first dielectric film 112 on the surface of the L$_1$ disc 110 was bonded to the L$_0$ disc 100 with the ultraviolet curable resin layer 109. It follows that the films given below were stacked in the L$_1$ disc 110 as viewed from the light incident side.
First dielectric film 112: ZnS—SiO$_2$, 65 nm;
Phase-change recording film 114: GeSbTe, 13 nm;
Second dielectric film 117: SiOC, 40 nm; and
Reflection film 116: Ag alloy, 100 nm.

In this Example, the SiOC film used as the second dielectric film 117 in the L$_1$ disc 110 was deposited by RF-superimposed DC sputtering under the conditions of a total pressure of 0.8 Pa and an oxygen partial pressure of 0.5 Pa. The carbon concentration in the SiOC film was 6.3 atomic %.

As apparent from Table 3, the phase-change optical recording medium for the Example 5 was also found to be satisfactory in any of the initial characteristics, the characteristics after the environmental test, and the overwrite characteristics.

Example 6

Dual-Layer Disc

Figure 4:
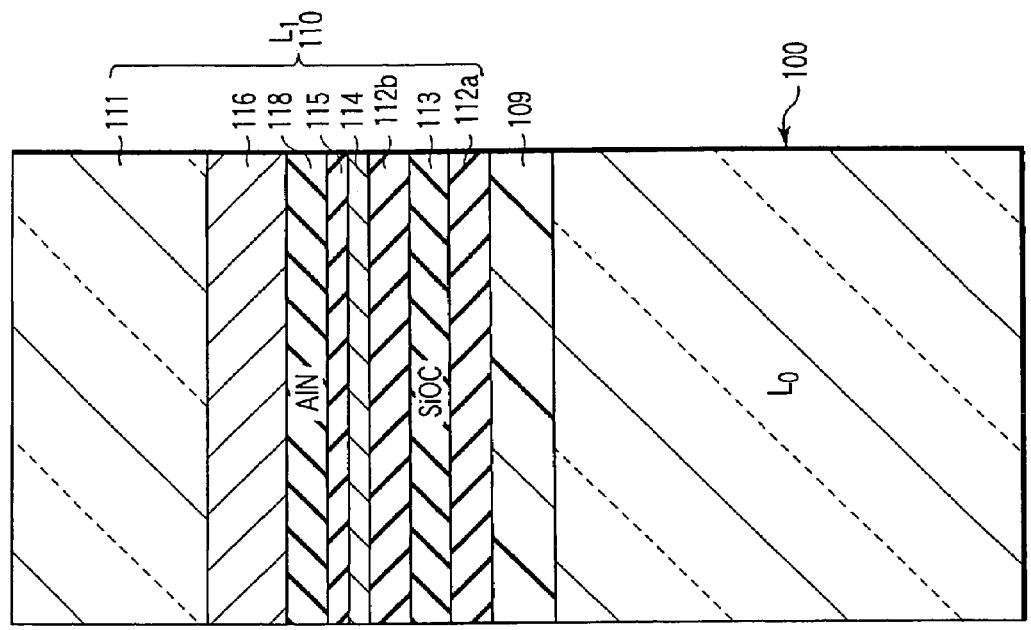
FIG. 4 is a cross-sectional view schematically showing the phase-change optical recording medium (dual-layer, single-sided disc) for Example 6 of the present invention.

FIG. 4 is the cross-sectional view schematically showing the phase-change optical recording medium for Example 6. The phase-change optical recording medium for this Example is also a dual-layer, single-sided disc, which was prepared by bonding the L$_0$ disc 100 to the L$_1$ disc 110.

The L$_0$ disc 100 included a polycarbonate substrate and a ZnS—SiO$_2$ film, a SiOC film, a GeSbTeBi film, a SiOC film, a ZnS—SiO$_2$ film, an Ag film, and a ZnS—SiO$_2$ film, which were stacked in this order on the polycarbonate substrate. The transmittance of the L$_0$ disc 100 was about 50%.

The L$_1$ disc 110 included the polycarbonate substrate 111 and the reflection film 116, the heat control film 118, the second dielectric film 115, the phase-change recording film 114, the high refractive index dielectric film 112b, the low refractive index dielectric film 113, and the high refractive index dielectric film 112a, which were stacked in this order on the polycarbonate substrate 111. The dielectric film 112a positioned on the surface of the L$_1$ disc 110 was bonded to the L$_0$ disc 100 with the ultraviolet curable resin layer 109. It follows that the films given below were stacked in the L$_1$ disc 110 as viewed from the light incident side.
High refractive index dielectric film 112a: ZnS—SiO$_2$, 20 nm;
Low refractive index dielectric film 112a: SiOC, 25 nm;
High refractive index dielectric film 112b: ZnS—SiO$_2$, 40 nm;
Phase-change recording film 114: GeSbTeBi, 13 nm;
Second dielectric film 117: ZnS—SiO$_2$, 15 nm;
Heat control film 118: AlN, 25 nm; and
Reflection film 116: Ag alloy, 100 nm.

In this Example, the SiOC film used as the low refractive index dielectric film 113 in the L$_1$ disc 110 was deposited by DC sputtering under the conditions of a total pressure of 0.5 Pa and an oxygen partial pressure of 0.01 Pa. The carbon concentration in the SiOC film was 5.0 atomic %.

As apparent from Table 3, the phase-change optical recording medium for the Example 6 was also found to be satisfactory in any of the initial characteristics, the characteristics after the environmental test, and the overwrite characteristics.

Example 7

A phase-change optical recording medium having a stacked structure as in Example 1 was manufactured except that a SiOC film used as the low refractive index dielectric film 103 was deposited by RF sputtering under the conditions of a total pressure of 1.0 Pa and an oxygen partial pressure of 0.1 Pa. The carbon concentration in the SiOC film was 0.1 atomic %.

As apparent from Table 3, the phase-change optical recording medium for the Example 7 was also found to be satisfactory in any of the initial characteristics, the characteristics after the environmental test, and the overwrite characteristics.

Example 8

A phase-change optical recording medium having a stacked structure as in Example 1 was manufactured except that a SiOC film used as the low refractive index dielectric film 103 was deposited by RF sputtering under the conditions of a total pressure of 1.0 Pa and an oxygen partial pressure of 0.07 Pa. The carbon concentration in the SiOC film was 1.0 atomic %.

As apparent from Table 3, the phase-change optical recording medium for the Example 8 was also found to be satisfactory in any of the initial characteristics, the characteristics after the environmental test, and the overwrite characteristics.

Example 9

A phase-change optical recording medium having a stacked structure as in Example 1 was manufactured except that a SiOC film used as the low refractive index dielectric film 103 was deposited by pulse mode DC sputtering under the conditions of a total pressure of 1.0 Pa and an oxygen partial pressure of 0.03 Pa. The carbon concentration in the SiOC film was 2.0 atomic %.

As apparent from Table 3, the phase-change optical recording medium for the Example 9 was also found to be satisfactory in any of the initial characteristics, the characteristics after the environmental test, and the overwrite characteristics.

Example 10

A phase-change optical recording medium having a stacked structure as in Example 1 was manufactured except that a SiOC film used as the low refractive index dielectric film 103 was deposited by RF-superimposed DC sputtering under the conditions of a total pressure of 1.0 Pa and an oxygen partial pressure of 0.3 Pa. The carbon concentration in the SiOC film was 0.5 atomic %.

As apparent from Table 3, the phase-change optical recording medium for the Example 10 was also found to be satisfactory in any of the initial characteristics, the characteristics after the environmental test, and the overwrite characteristics.

Figure 5:
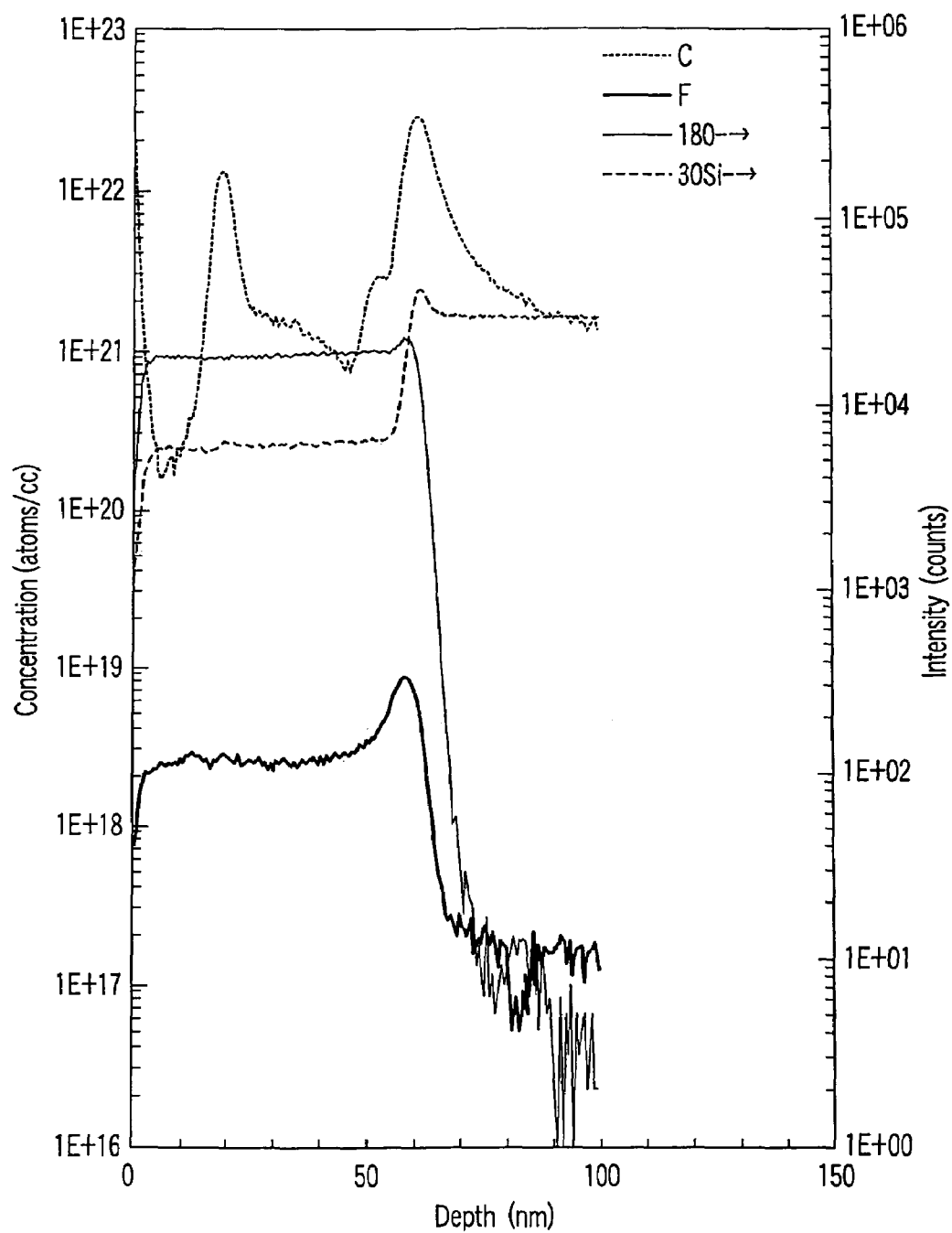
FIG. 5 is a graph showing the concentration distribution of the elements contained in a SiOC film used in a phase-change optical recording medium according to an embodiment of the present invention.

FIG. 5 is a graph showing the concentration distribution of the elements contained in a SiOC film used in the phase-change optical recording medium of the present invention. The concentrations of the elements were measured for a SiOC film deposited on a silicon substrate. The left-side edge of the graph denotes the surface of the SiOC film. The region on the right side relative to the region where all elements represent the peaks, in the vicinity of about 60 nm deep from the surface, denotes the substrate (silicon wafer). As apparent from the graph of FIG. 5, it is possible to increase the carbon concentration not only in the surface region of the SiOC film but also inside the film.

Figure 6:
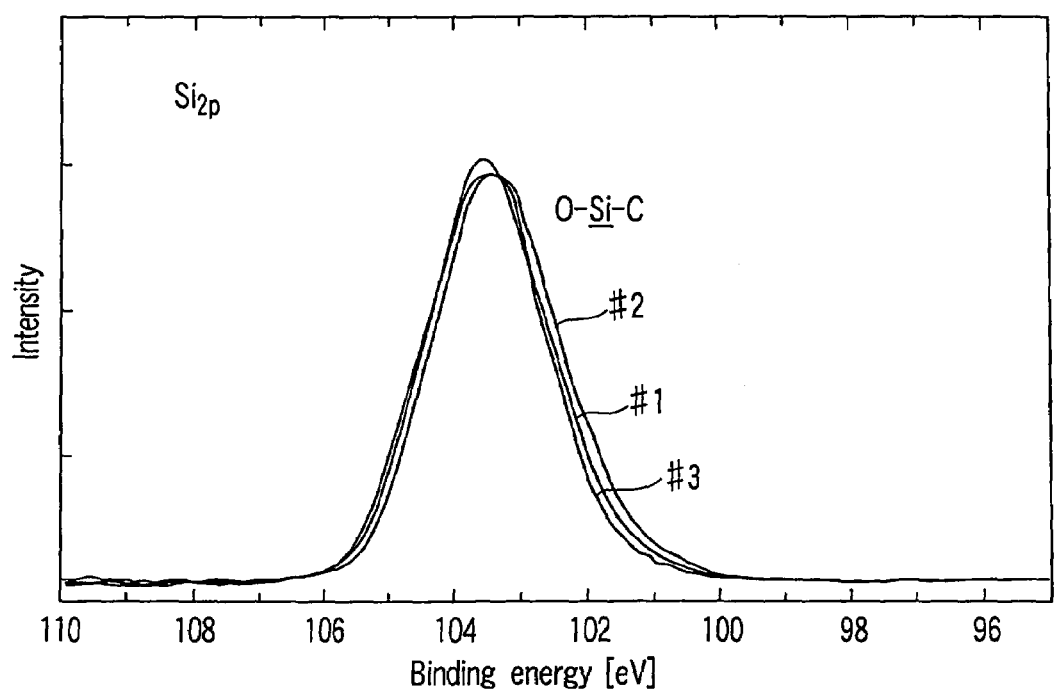
FIG. 6 shows an X-ray photoelectron spectrum of $Si_{2p}$ in a SiOC film used in a phase-change optical recording medium according to an embodiment of the present invention.

FIG. 6 shows an XPS spectrum of $Si_{2p}$ in a SiOC film used in a phase-change optical recording medium according to an embodiment of the present invention. Three samples of SiOC films each having a thickness of about 100 nm were deposited on silicon substrates, respectively, which were subjected to XPS analysis.

The carbon concentrations for these samples, measured by RBS, were as follows:
1 14.6 atomic %
2 17.8 atomic %
3 9.1 atomic %.

It was found that there were differences in the bonding state of Si among the samples #1 to #3, that is, as the carbon concentration was higher, the spectrum component of $Si_{2p}$ in the lower energy became prominent. Thus, it was conceivable that the spectrum component of $Si_{2p}$ in the lower energy was due to Si bonded to C.

Here, the peak values in XPS spectra of $Si_{2p}$ for $SiO_2$ and SiC reported in various references are as follows:
$SiO_2$ 103.2-104 ev
SiC 100.4 eV.

The peak in the XPS spectrum of $Si_{2p}$ of FIG. 6 appeared in the higher energy than the $Si_{2p}$ peak value (100.4 eV) for the SiC film. Also, it was judged from bonding states between Si and another element, estimated from XPS spectra of $C_{1s}$ or $O_{1s}$, that isolated SiC was not contained in the SiOC film. Therefore, it was estimated that the XPS spectrum of FIG. 6 was attributed to O—Si—C bond.

Comparative Example 1

A phase-change optical recording medium was manufactured by successively stacking, on a polycarbonate substrate, a ZnS—$SiO_2$ film (30 nm), a SiOC film (60 nm), a ZnS—$SiO_2$ film (25 nm), a GeSbTe film (13 nm), a ZnS—$SiO_2$ film (20 nm), and an Ag film (100 nm) in this order from the light incident side.

In this Comparative Example, the SiOC film used as the low refractive index dielectric film was deposited by RF sputtering under the conditions of a total pressure of 0.5 Pa and an oxygen partial pressure of 0.008 Pa. The carbon concentration in the SiOC film was 0.09 atomic %.

As shown in Table 3, the CNR value of 47.6 dB and the X–E value of 1.7 dB as the initial characteristics, the CNR value of 46.8 dB and the X–E value of 1.8 dB as the characteristics after the environmental test, and the CNR value of 46.9 dB as the overwrite characteristics were obtained. Thus, the phase-change optical recording medium for the Comparative Example 1 failed to exhibit satisfactory characteristics.

Comparative Example 2

In this Comparative Example, $SiO_2$ was used in place of SiOC. To be more specific, a phase-change optical recording medium was manufactured by successively stacking, on a polycarbonate substrate, a ZnS—$SiO_2$ film (30 nm), a $SiO_2$ film (60 nm), a ZnS—$SiO_2$ film (25 nm), a GeSbTe film (13 nm), a ZnS—$SiO_2$ film (20 nm), and an Ag film (100 nm) in this order from the light incident side.

As shown in Table 3, the CNR value of 47.3 dB and the X–E value of 1.8 dB as the initial characteristics, the CNR value of 46.4 dB and the X–E value of 2.1 dB as the characteristics after the environmental test, and the CNR value of 46.5 dB as the overwrite characteristics were obtained. Thus, the phase-change optical recording medium for the Comparative Example 2 failed to exhibit satisfactory characteristics.

Comparative Example 3

A phase-change optical recording medium having a stacked structure as in Comparative Example 1 was manufactured except that a SiOC film used as the low refractive index dielectric film was deposited by RF-superimposed DC sputtering under the conditions of a total pressure of 0.5 Pa and an oxygen partial pressure of 0.007 Pa. The carbon concentration in the SiOC film was 0.005 atomic %.

As apparent from Table 3, the phase-change optical recording medium for the Comparative Example 3 was found not to be satisfactory in any of the initial characteristics, the characteristics after the environmental test, and the overwrite characteristics.

Comparative Example 4

A phase-change optical recording medium having a stacked structure as in Comparative Example 1 was manufactured except that a SiOC film used as the low refractive index dielectric film was deposited by DC sputtering under the conditions of a total pressure of 1.1 Pa and an oxygen partial pressure of 0.003 Pa. The carbon concentration in the SiOC film was 0.003 atomic %.

As apparent from Table 3, the phase-change optical recording medium for the Comparative Example 4 was found not to be satisfactory in any of the initial characteristics, the characteristics after the environmental test, and the overwrite characteristics.

Comparative Example 5

A phase-change optical recording medium having a stacked structure as in Comparative Example 1 was manufactured except that a SiOC film used as the low refractive index dielectric film was deposited by pulse mode DC sputtering under the conditions of a total pressure of 1.1 Pa and an oxygen partial pressure of 0.001 Pa. The carbon concentration in the SiOC film was 35 atomic %.

As apparent from Table 3, the phase-change optical recording medium for the Comparative Example 5 was found not to be satisfactory in any of the initial characteristics, the characteristics after the environmental test, and the overwrite characteristics.

Comparative Example 6

A phase-change optical recording medium having a stacked structure as in Comparative Example 1 was manufactured except that a SiOC film used as the low refractive index dielectric film was formed by RF-superimposed DC sputtering under the conditions of a total pressure of 1.1 Pa and an oxygen partial pressure of 0.006 Pa. The carbon concentration in the SiOC film was 40 atomic %.

As apparent from Table 3, the phase-change optical recording medium for the Comparative Example 6 was found not to be satisfactory in any of the initial characteristics, the characteristics after the environmental test, and the overwrite characteristics.

Comparative Example 7

A phase-change optical recording medium having a stacked structure as in Comparative Example 1 was manufactured except that a SiOC film used as the low refractive index dielectric film was formed by pulse mode DC sputtering under the conditions of a total pressure of 1.0 Pa and an oxygen partial pressure of 0.004 Pa. The carbon concentration in the SiOC film was 34 atomic %.

As apparent from Table 3, the phase-change optical recording medium for the Comparative Example 7 was found not to be satisfactory in any of the initial characteristics, the characteristics after the environmental test, and the overwrite characteristics.

Comparative Example 8

A phase-change optical recording medium having a stacked structure as in Comparative Example 1 was manufactured except that a SiOC film used as the low refractive index dielectric film was formed by RF sputtering under the conditions of a total pressure of 1.0 Pa and an oxygen partial pressure of 0.004 Pa. The carbon concentration in the SiOC film was 32 atomic %.

As apparent from Table 3, the phase-change optical recording medium for the Comparative Example 8 was found not to be satisfactory in any of the initial characteristics, the characteristics after the environmental test, and the overwrite characteristics.

As apparent from the experimental data given above, the phase-change optical recording medium can generates high intensity reproduction signals and can make it possible to suppress the cross-erase, if the carbon concentration in the SiOC film falls within a range of between 0.1 and 30 atomic % as in each of the Examples.

Table 1 supports that the composition of the SiOC film is delicately dependent on the deposition conditions, too. It should be noted, however, that, if the total pressure of the sputtering gas is 1 Pa or less and the oxygen partial pressure falls within a range of between 0.01 and 0.5 Pa, suitable SiOC films noted above can be advantageous obtained.

TABLE 1

|  | Discharge method | Total pressure [Pa] | Oxygen partial pressure [Pa] | C [at. %] | Si [at. %] | O [at. %] |
| --- | --- | --- | --- | --- | --- | --- |
| Example 1 | pulse mode DC | 1.0 | 0.1 | 28.2 | 32.19 | 39.60 |
| Example 2 | RF | 1.0 | 0.02 | 30.0 | 31.39 | 38.61 |
| Example 3 | RF | 1.0 | 0.2 | 19.7 | 36.01 | 44.29 |
| Example 4 | DC | 1.0 | 0.08 | 10.3 | 38.33 | 51.37 |
| Example 5 | RF-superimposed DC | 0.8 | 0.5 | 6.3 | 42.02 | 51.68 |
| Example 6 | DC | 0.5 | 0.01 | 5.0 | 40.60 | 54.40 |
| Example 7 | RF | 1.0 | 0.1 | 0.1 | 44.80 | 55.10 |
| Example 8 | RF | 1.0 | 0.07 | 1 | 44.39 | 54.61 |
| Example 9 | pulse mode DC | 1.0 | 0.03 | 2 | 43.95 | 54.05 |
| Example 10 | RF-superimposed DC | 1.0 | 0.3 | 0.5 | 35.54 | 63.96 |
| Comparative Example 1 | RF | 0.5 | 0.008 | 0.09 | 34.45 | 65.44 |
| Comparative Example 2 | RF | 1.0 | 0 | 0 | 34.48 | 65.52 |
| Comparative Example 3 | RF-superimposed DC | 0.5 | 0.007 | 0.005 | 34.48 | 65.51 |

TABLE 1-continued

|  | Discharge method | Total pressure [Pa] | Oxygen partial pressure [Pa] | C [at. %] | Si [at. %] | O [at. %] |
|---|---|---|---|---|---|---|
| Comparative Example 4 | DC | 1.1 | 0.003 | 0.003 | 34.47 | 65.52 |
| Comparative Example 5 | pulse mode DC | 1.1 | 0.001 | 35 | 29.15 | 35.85 |
| Comparative Example 6 | RF-superimposed DC | 1.0 | 0.006 | 40 | 26.91 | 33.09 |
| Comparative Example 7 | pulse mode DC | 1.0 | 0.004 | 34 | 29.60 | 36.40 |
| Comparative Example 8 | RF | 1.0 | 0.004 | 32 | 30.49 | 37.51 |

TABLE 2

|  | n | k | T [%] | $\lambda_{th}$ [W/m·K] | Si—O peak shift [cm$^{-1}$] |
|---|---|---|---|---|---|
| Example 1 | 1.54 | 0.0070 | 98.1 | 1.84 | 48.07 |
| Example 2 | 1.55 | 0.0090 | 98.0 | 2.00 | 50.00 |
| Example 3 | 1.52 | 0.0008 | 98.7 | 1.35 | 34.54 |
| Example 4 | 1.51 | 0.0007 | 98.8 | 0.95 | 18.99 |
| Example 5 | 1.50 | 0.0004 | 98.5 | 0.83 | 12.53 |
| Example 6 | 1.49 | 0.0006 | 99.2 | 0.79 | 10.45 |
| Example 7 | 1.48 | 0.0001 | 99.3 | 0.68 | 2.71 |
| Example 8 | 1.48 | 0.0005 | 99.6 | 0.70 | 4.12 |
| Example 9 | 1.48 | 0.0005 | 99.4 | 0.72 | 5.69 |
| Example 10 | 1.48 | 0.0002 | 99.1 | 0.69 | 3.34 |
| Comparative Example 1 | 1.48 | 0.0000 | 99.9 | 0.59 | 0.00 |
| Comparative Example 2 | 1.48 | 0.0000 | 99.9 | 0.58 | 0.00 |
| Comparative Example 3 | 1.48 | 0.0000 | 99.9 | 0.58 | 0.00 |
| Comparative Example 4 | 1.48 | 0.0000 | 99.9 | 0.58 | 0.00 |
| Comparative Example 5 | 1.75 | 0.45 | 75.7 | 2.04 | 61.02 |
| Comparative Example 6 | 1.92 | 0.91 | 70.8 | 2.36 | 69.98 |
| Comparative Example 7 | 1.74 | 0.43 | 76.7 | 1.98 | 59.25 |
| Comparative Example 8 | 1.72 | 0.41 | 77.5 | 1.86 | 55.72 |

TABLE 3

|  | initial characteristics | | characteristics after environmental test | | overwrite characteristics |
|---|---|---|---|---|---|
|  | CNR [dB] | X-E [dB] | CNR [dB] | X-E [dB] | CNR [dB] |
| Example 1 | 55.2 | 0.2 | 53.8 | 0.3 | 54.7 |
| Example 2 | 54.5 | 0.1 | 54.1 | 0.2 | 54.2 |
| Example 3 | 56.8 | 0.2 | 55.3 | 0.2 | 55.4 |
| Example 4 | 55.4 | 0.1 | 55.0 | 0.2 | 54.3 |
| Example 5 | 53.8 | 0.2 | 52.7 | 0.3 | 52.8 |
| Example 6 | 53.6 | 0.2 | 52.5 | 0.3 | 52.6 |
| Example 7 | 54.2 | 0.2 | 53.7 | 0.3 | 53.8 |
| Example 8 | 53.4 | 0.2 | 52.3 | 0.2 | 52.4 |
| Example 9 | 52.9 | 0.1 | 52.0 | 0.3 | 52.4 |
| Example 10 | 53.6 | 0.2 | 52.4 | 0.2 | 52.7 |
| Comparative Example 1 | 47.6 | 1.7 | 46.8 | 1.8 | 46.9 |
| Comparative Example 2 | 47.3 | 1.8 | 46.4 | 2.1 | 46.5 |
| Comparative Example 3 | 48.3 | 1.9 | 46.5 | 1.9 | 47.4 |
| Comparative Example 4 | 46.5 | 0.7 | 45.0 | 1.8 | 45.1 |
| Comparative Example 5 | 46.7 | 1.8 | 45.2 | 1.9 | 45.3 |
| Comparative Example 6 | 46.9 | 1.8 | 45.4 | 2.4 | 45.5 |
| Comparative Example 7 | 46.3 | 1.7 | 44.7 | 1.9 | 45.1 |
| Comparative Example 8 | 49.9 | 1.8 | 48.0 | 1.8 | 47.1 |

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A phase-change optical recording medium, comprising:
   a phase-change recording film to which recording and erasure can be reversibly performed by irradiation with light; and
   a first dielectric film with a stacked structure including a high refractive index dielectric film, a low refractive index dielectric film and another high refractive index dielectric film, the first dielectric film being arranged on a light incident side with respect to the phase-change recording film,
   wherein the low refractive index dielectric film contains Si, O and C, and has a carbon concentration within a range of between 0.1 and 30 atomic %, and
   wherein the low refractive index dielectric film has a transmittance of 95% or more.

2. The phase-change optical recording medium according to claim 1, wherein the low refractive index dielectric film has a complex refractive index denoted by n-ik satisfying the conditions of 1.45<n<1.55 and k<0.01.

3. The phase-change optical recording medium according to claim 1, wherein the low refractive index dielectric film has a thermal conductivity $\lambda_{th}$ [W/m K] within a range of 0.6<$\lambda_{th}$<4.0 at room temperature and under an atmospheric pressure.

4. The phase-change optical recording medium according to claim 1, wherein the low refractive index dielectric film shows an infrared absorption peak attributed to a Si—O bond shifted from an infrared absorption peak attributed to a Si—O bond in $SiO_2$ by 0.1 to 50 cm$^{-1}$.

5. The phase-change optical recording medium according to claim 1, wherein the low refractive index dielectric film includes an O—Si—C bond detected by X-ray photoelectron spectroscopy.

6. The phase-change optical recording medium according to claim 1, wherein the phase-change recording film is formed of a material selected from the group consisting of GeSbTeBi, GeSbTe, BiGeTe, GeSbTeSn, AgInSbTe, InSbTe, AgInGeSbTe, GeInSbTe and AgInSbTeV.

7. The phase-change optical recording medium according to claim 1, wherein the high refractive index dielectric films are formed of $ZnS\text{---}SiO_2$.

8. The phase-change optical recording medium according to claim 1, wherein a second dielectric film arranged on the side opposite to the light incident side with respect to the phase-change recording film contains Si, O and C.

9. The phase-change optical recording medium according to claim 1, further comprising an interface film arranged in contact with at least one surface of the phase-change recording film.

10. The phase-change optical recording medium according to claim 9, wherein the interface film is formed of a material selected from the group consisting of GeN, CrO, SiC, SiN and SiOC.

11. The phase-change optical recording medium according to claim 1, further comprising:

a second dielectric film being arranged on an opposite side of the light incident side with respect to the phase-change recording film;

a reflection film; and a heat control film arranged between the second dielectric film and the reflection film.

12. The phase-change optical recording medium according to claim 1, wherein the medium is a dual-layer single-sided disc where two discs are bonded with each other.

* * * * *